US009726132B2

(12) United States Patent
Pawlicki

(10) Patent No.: US 9,726,132 B2
(45) Date of Patent: Aug. 8, 2017

(54) BARRING-TOOL SYSTEM AND METHOD

(71) Applicant: Phillip Pawlicki, New Orleans, LA (US)

(72) Inventor: Phillip Pawlicki, New Orleans, LA (US)

(*) Notice: Subject to any disclaimer, the term of this patent is extended or adjusted under 35 U.S.C. 154(b) by 111 days.

(21) Appl. No.: 14/749,440

(22) Filed: Jun. 24, 2015

(65) Prior Publication Data

US 2016/0375528 A1 Dec. 29, 2016

(51) Int. Cl.

| | |
|---|---|
| ***F02N 15/06*** | (2006.01) |
| ***F02N 7/08*** | (2006.01) |
| ***F01D 25/34*** | (2006.01) |
| ***F16H 35/18*** | (2006.01) |
| ***F02N 15/00*** | (2006.01) |
| ***F02N 19/00*** | (2010.01) |

(52) U.S. Cl.

CPC ............ *F02N 7/08* (2013.01); *F02N 15/006* (2013.01); *F02N 15/06* (2013.01); *F02N 19/00* (2013.01); *F01D 25/34* (2013.01)

(58) Field of Classification Search

CPC .... F02N 15/003; F02N 15/006; F02N 15/065; F02N 9/00; F02N 9/02; F02N 9/04; F02N 15/06; F02N 7/08; F01D 25/34; F01D 19/00; F16H 35/18

USPC ........ 74/6, 7 R, 8, 732.1, 411.5; 123/179.25; 91/53; 60/788, 646, 570, 343

See application file for complete search history.

(56) References Cited

U.S. PATENT DOCUMENTS

| | | | | |
|---|---|---|---|---|
| 2,204,437 A * | 6/1940 | Nardone | F02N 7/06 | 123/179.31 |
| 2,358,445 A * | 9/1944 | Cone | F02N 15/043 | 123/179.31 |
| 3,794,009 A * | 2/1974 | Wenrich | F02N 7/08 | 123/179.31 |
| 3,960,362 A * | 6/1976 | Griffiths | B66D 3/24 | 254/276 |
| 4,274,292 A * | 6/1981 | Arnett, Jr. | F02N 7/08 | 123/179.31 |
| 4,347,813 A * | 9/1982 | Maucher | F02N 5/04 | 123/179.22 |
| 4,535,655 A | 8/1985 | Avery | | |
| 5,018,414 A | 5/1991 | Naumann | | |
| 5,269,195 A * | 12/1993 | Kitagawara | B60T 1/005 | 188/69 |
| 5,337,713 A * | 8/1994 | Mills | F02N 7/08 | 123/179.3 |
| 6,125,713 A * | 10/2000 | Langlois | B23P 6/00 | 29/402.01 |
| 6,405,585 B1 | 6/2002 | Hewitt | | |
| 6,802,207 B2 | 10/2004 | Okuda et al. | | |

(Continued)

FOREIGN PATENT DOCUMENTS

| | | | |
|---|---|---|---|
| GB | 2178797 * | 2/1987 | F02N 11/12 |
| JP | H0517264 * | 5/1993 | F16H 63/34 |

*Primary Examiner* — Victor MacArthur
*Assistant Examiner* — Bobby Rushing, Jr.
(74) *Attorney, Agent, or Firm* — Keaty Law Firm, LLC

(57) ABSTRACT

A barring-tool system improving safety, speed, effectiveness, and number of personnel required for maintenance, repair, and inspection of large engines, generators, and turbines, providing controlled bidirectional rotation and locking of crankshafts during maintenance, and a method for maintenance of large engines, generators, and turbines using the barring-tool system.

4 Claims, 9 Drawing Sheets

(56) References Cited

U.S. PATENT DOCUMENTS

| | | | | |
|---|---|---|---|---|
| 7,624,654 | B1 | 12/2009 | Fleming | |
| 7,665,439 | B2 * | 2/2010 | Eichenberger | F02N 7/08 123/179.31 |
| 7,849,734 | B2 | 12/2010 | Moritani | |
| 8,317,490 | B2 * | 11/2012 | Manning | F04B 35/00 310/41 |
| 2003/0000693 | A1 | 1/2003 | Couren et al. | |

* cited by examiner

PRIOR ART

BARRING-TOOL SYSTEM AND METHOD

BACKGROUND OF THE INVENTION

This invention provides a barring-tool system improving safety, speed, and effectiveness of maintenance of large engines, generators, and turbines, by controlled bidirectional rotation and locking of crankshafts, and a method for maintenance of large engines, generators, and turbines using the barring-tool system.

Large engines, generators, and turbines, are used to generate mechanical force for industrial processes, to pump fluids, and to generate electricity. These large engines are variations of the steam engines of the Industrial Revolution, and are characterized by a rotating crankshaft and pistons or the equivalent, where the force upon the pistons is translated into rotation of the crankshaft. The crankshaft generally extends outside the engine housing in at least one direction. In the 360 degrees of rotation of the crankshaft, there is a nominal zero-degree position known as top dead center—historically a point from which the engine could not move on its own. Historically, when a steam engine was stuck at top dead center, the crankshaft would be rotated by the application of human force leveraged through an iron or steel bar which engaged the teeth of a ring gear surrounding a flywheel surrounding the crankshaft. That is the origin of the term “barring” for rotating the crankshaft of an engine when it is not running.

Barring remains very important today, even when the engines are able to start from top dead center, because of maintenance requirements of engines. For maintenance, repair, retrofitting, and inspection of large engines, the engine cannot be running—that would kill the people performing the maintenance. There has to be a way to rotate the crankshaft under outside, controllable power, because pistons and other parts must be moved into positions where they can be inspected and worked upon, and then after that other pistons and parts must be moved into position. Partly because of this requirement for barring, engines are generally equipped with a flywheel surrounding the exposed crankshaft, and with a ring gear surrounding the flywheel.

Manual barring is still performed. See FIG. 1. The procedure requires more than one person, not only to produce sufficient force, but also to look into the engine through various openings on various sides of the engine housing to determine the positions of various parts. There is a great danger that the instructions from a person having a body part placed inside the engine for inspection or maintenance will not be heard in a noisy engine room, and that the other persons will rotate the crankshaft and injure that person.

Another disadvantage of the present state of the art for barring of engines is that after a crankshaft is put into its proper place, any addition, removal, or adjustment of parts inside the engine might shift the balance and cause a spontaneous rotation of the crankshaft, which is a condition that is dangerous to the maintenance personnel, and might damage the engine itself.

For many decades, the state of the art for barring of engines has been a single hydraulic jack providing essentially upward pressure on a ring gear surrounding a flywheel surrounding a crankshaft. Among the disadvantages of such an arrangement is that the hydraulic jack can only rotate the crankshaft in one direction, the hydraulic jack cannot lock the crankshaft against spontaneous rotation, and more than one person is still required—one to operate the hydraulic jack, and others to look into the engine through various openings and relay instructions to the jack operator. The danger of injury to personnel and of losing the desired positioning is still present with hydraulic jacking.

Although the engines are large, they are subject to close tolerances. The upward force exerted by a hydraulic jack in the present state of the art can deflect or bend a crankshaft by a significant amount, skewing the measurements and affecting the performance of the engine.

The use of electrical switches, motors, and equipment in most engine rooms is limited to explosion-proof electrical devices, costing significantly more than standard electrical devices. The use of pneumatic and hydraulic controls and actuators in an engine-room environment can provide a safer, more cost-effective system than a purely electrical one.

There is a need for a barring tool system which can be operated by one person who is free to move around the engine during the barring process for the purposes of observation, which applies a rotational force rather than upward force in order to avoid deflection, which is capable of locking a ring-gear-flywheel-crankshaft unit in place in order to avoid spontaneous rotation, and which is explosion-proof for operation in an engine-room environment.

Various patents discuss the use of a toothed pinion that intermeshes with a ring gear so as to manipulate the ring gear. The toothed pinion is then mechanically or manually acted upon to provide rotation of the ring gear. Some of the devices teach the use of a gripper to fasten to the ring gear device to be turned, wherein the gripper is connected to a motor which would rotate the gripper and ring gear device. Many patents discuss a ring gear fastened to an outer race of a slew bearing that has an inner race that is fastened to the structure to rotate within the outer race driven by the second motor.

U.S. Pat. No. 7,624,654 issued Matthew Fleming et al on Dec. 1, 2009 for “Automated System and Method for Probe Measurements of Stack Gas Flow Properties” discloses an automated probe for obtaining data at various locations in a stack flow. The measured characteristics relate to such properties as a stack gas stream and flow velocity. A probe assembly is introduced into a stack through a test port and operated by an automated mechanism mounted on the test port to position a sensing tip at various locations within the gas stream at proper yaw angle. A support structure for the probe assembly comprises end walls that are joined through two rigid trusses disposed on opposite sides of the probe assembly. Extending between the end walls is a servo-motor-powered linear actuator having a traveling carrier to which a gripper assembly is attached. As actuator operates, it moves the carrier to impart travel to the support structure, which supports the probe assembly while allowing the probe assembly to translate on the framework along an axis but constraining the probe assembly from turning on the framework about the axis. With a gripper assembly gripping the probe assembly and another gripper assembly released, a linear actuator can move the first gripper assembly along the axis to translate the probe assembly on the framework. A motor is also mounted on the framework. The motor can turn a pinion that is in mesh with a toothed segment of a ring gear, which attaches to the stack port so that the motor can turn the framework and probe assembly together about the axis. The patent also discloses a ring gear fastened to an outer race of a slew bearing that has an inner race that is fastened to the structure to rotate within the outer race driven by the second motor. The gripper assembly may be mounted on a carrier of a linear actuator which contains and is operated by the first motor.

U.S. Pat. No. 6,802,207 issued to Yoshifumi Okuda and Yahiko Iwasaki on Oct. 12, 2004 for "Rotational Driving Apparatus for Testing Internal Combustion Engine" discloses a rotational driving apparatus for testing an internal combustion engine. The apparatus has a rotor that is rotated about a rotation axis of the ring gear, and a pivot portion supported in a support position with respect to the rotor. The support position is located away from a front end and a rear end of the pivot portion in the direction of the rotation axis of the ring gear. An engaging portion is provided at the front end of the pivot portion with respect to the ring gear. Consequently, when the rotor is rotated, a torque in the direction in which the engaging portion is caused to engage the ring gear is generated by a portion between the support position and the rear end of the pivot portion. This torque cancels out at least a portion of a torque generated at a portion on the front end side of the pivot portion. As a result, the control force that is required to displace the engaging portion is reduced, even if the rotor is rotated at high speeds. In one described embodiment, a link that is operatively connected to the pivot portion directly or indirectly is employed so as to manipulate the engaging portion between an engaged position in which it engages the ring gear and a non-engaged position. This link is also joined to a reciprocating member that is shifted in the direction of the rotation axis by an actuator. The angle that is formed between the link and the rotation axis is preferably large. Thus, the horizontal component of the total torque generated by the centrifugal force that acts on the pivot portion is reduced before being transmitted to the reciprocating member, and thus the effects, when running at high speeds, of the centrifugal force on the control force for engaging the engaging portion with the ring gear can be further reduced.

U.S. Pat. No. 6,405,585 issued to Staley J Hewitt on Jun. 18, 2002 for "Portable Flywheel Test Assembly" discloses a portable dynamometer for testing an engine having an output shaft. The tester comprises a table frame, a flywheel drive axle which is mounted to the table, a flywheel coaxially secured to the flywheel drive axle, an engine mounting pad assembly, and an endless loop means. The axle is drivingly connected with a sprocket hub assembly, on which the flywheel is mounted. A ring gear is mounted for rotation on the axle in spaced relation to the flywheel. The unit to be tested mounts on a mounting plate which can be secured to the top—or side of the table. An endless loop drive mechanism interconnects the axle and the engine being tested. A chain or belt drivingly connects a driven sprocket or pulley hub assembly with the unit to be tested. The sprocket or pulley hub assembly can be moved to various locations along the axle. The table can also be pivoted ninety degrees. These features allow the flywheel test assembly to easily adapt to and test units having either horizontal or vertical output shafts. The flywheel test assembly also utilizes an automotive-type starter system in which the starter motor engages a ring gear attached to the axle. Thus, when the starter motor turns the ring gear, the flywheel, the sprocket hub assembly, and therefore the engine are driven. The ring gear may have a plurality of teeth in which the starter has a selectively extensible output gear with a plurality of teeth for engaging the ring gear when operated. Another feature of the invention includes a brake mounted on the frame for decelerating the flywheel through contact with the flywheel such that the flywheel acts as a rotor for the brake. The brake may comprise a hydraulically operated caliper brake with a first brake pad for engaging the flywheel and a second brake pad for engaging the second side surface of the flywheel.

U.S. Pat. No. 8,317,490 issued to John B. Manning Nov. 27, 2012 for "Torque Drive Mechanism for Gas Compressor" discloses a method for limiting startup current drawn by an electric motor used for moving pressurized fluid through a supply conduit. The drive mechanism incorporates one or more air or gas engine starters to initiate rotation of a gas compressor and its associated driving electric motor. The system for compression of gas includes a single shaft electric motor with a single motor shaft, a compressor with a compressor shaft, a coupler with a first end coupled to the single motor shaft and a second end coupled to the compressor shaft, a gear coupled to the coupler, and at least one starter selectively detachably coupled to the gear. The gear may be coupled to the first end of the coupler and in another embodiment, to the second end of the coupler. In a certain embodiment, the gear may include a flywheel with teeth at a periphery of the flywheel. In certain embodiments, the gear may include a flywheel further including a plurality of sections, each coupled the coupler. Each section may include one or more removable sections having teeth-like elements. The flywheel may also include a dished section coupled to the coupler. In additional embodiments of the invention, the system may include a plurality of starters capable of being selectively detachably coupled to the gear. The system may also include a detector of a rotational speed, possibly optical or a magnetic, of the single motor shaft and a controller coupled to the detector of the rotational speed of the single motor shaft and to the switch. The method includes the steps of mounting a gear on the coupler and mounting a starter selectively engagably coupled to the gear. In some embodiments of the invention, the method may include operationally connecting a regulator to a switch and connecting the regulator to a source of pressurized fluid and to the starter. In other embodiments, the method may include a step of operationally connecting another regulator to the starter and connecting that regulator to a source of pressurized fluid and to the starter.

U.S. Pat. No. 7,849,734 issued to Hitoshi Moritani on Dec. 14, 2010 for "Test Equipment of Engine Motoring" discloses test equipment for an engine motor. The test equipment has a conveying mechanism to carry an engine in and out of test position, a fixing mechanism to fix the engine, a coupling mechanism to directly couple an electrical motor to a crank shaft of the engine, an encoder to synchronize the electrical motor rotation, a plurality of detection units, a control means for controlling the movement of the positioning equipment, testing means, and a base that holds the electrical motor and coupling mechanism as well as supporting the conveying mechanism. The base has a frame formed in a gate shape and opens in the conveying direction to cover the sides and top of the engine while it is in the test position. The base also supports a plurality of detection and testing units about the frame. The coupling mechanism has a plurality of coupling fingers that are swingably driven to engage with the ring gear. The coupling mechanism is placed behind the engine and is fixed to the base via a holder. The coupling mechanism has a transmitting member that transmits the rotation of the electric motor turning the motor as the electric motor rotates.

U.S. Pat. No. 4,535,655 issued Robert C. Avery Aug. 20, 1985 for "Engine Turning Tool Bracket" discloses an apparatus useful for manually rotating a rotable system, such as an engine. The apparatus has a stationary housing with an opening, a plate with slots, a bar with capability of being placed between the slots contacting the engine and rotating the engine manually by way of the bar. The plate is removably secured or fastened by means of bolting the plate to the housing and may be adjustable. The bar can be placed at least partially in the slot so that the first end contacts the system and the second end is capable of being manually held. With the bar in this position, manually rotating the bar, e.g., about the slot in which the bar placed, causes the system to rotate as desired. The disclosure contemplates that the apparatus may be used to work on an engine, transmission, clutch, or similar rotatable mechanism.

U.S. Pat. No. 5,018,414 issued Richard Naumann May 28, 1991 for “Transmission Servicing Tool” discloses a tool to facilitate removal and servicing an automotive transmission wherein the transmission comprises a housing operatively mounted on an engine, a wheel rotatably mounted in the housing, and a ring gear on the wheel being engaged by the pinion of a starter motor. The torque converter repair tool has a small plate that can be mounted on the torque converter housing with the starter motor removed. A positioning hole in the plate engages over a locator stud, which is normally used to position the starter motor, and another hole slidably receives a hand screw that threads into a tapped hole in the housing to secure the tool temporarily in place. A shaft is rotatable in the plate, and, when in place, a pinion on the inboard portion of the shaft engages the ring gear of the torque converter. The outboard end of the shaft may be engaged by a socket wrench for hand rotation of the shaft and, with it, the flywheel.

U.S. Pat. No. 4,979,409 issued Junior G Garrett and Robert L. Meadows Dec. 25, 1990 for “Clutch Adjusting Tool” discloses an adjusting tool for adjusting the ring of a clutch assembly by which the tool grips the clutch ring gear and allows for manual manipulation of the ring gear. The tool has a mounting fixture for attachment to the housing with a drive gear device which engage the lugs and thereby engage the ring gear, a drive gear shaft with gear teeth to mesh with the lugs on the ring gear, and a mounting fixture with an opening for rotatably supporting the driver gear shaft. The ring gear can be engaged with the tool through the use of a suitable wrench. In another embodiment the mounting fixture has a base and threadably attached to an adjusting ring rotated about an axis to move the ring. Other features include three gear teeth radiating from the shaft. In another embodiment the cover has an access hole cover attachment that allows reasonable means of mounting the tool to the cover.

SUMMARY OF THE INVENTION

This invention provides a barring-tool system improving safety, speed, and effectiveness of maintenance of large engines, generators, and turbines by controlled bidirectional rotation and locking of crankshafts, and a method for maintenance of large engines, generators, and turbines using the barring-tool system.

The barring-tool system of the present invention solves several existing problems of spontaneous movement of crankshafts, one-way movement of crankshafts, upward deflection of crankshafts, requirements for multiple personnel in the barring process, and use in an explosive engine-room environment.

BRIEF DESCRIPTION OF DRAWINGS

Reference will now be made to the drawings, wherein like parts are designated by like numerals, and wherein.

DETAILED DESCRIPTION OF THE INVENTION

Figure 1:
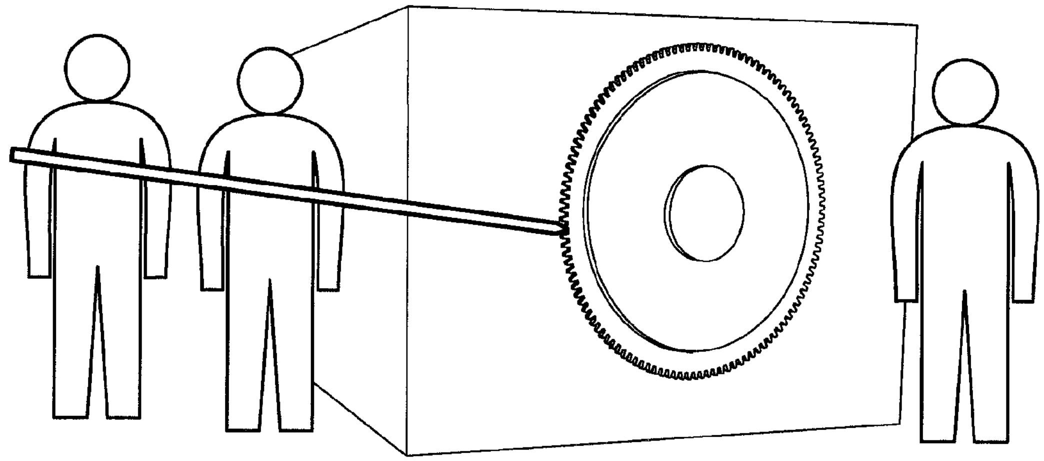
FIG. 1 PRIOR ART
FIG. 1 is a schematic view of the prior art of barring.
Figure 2:
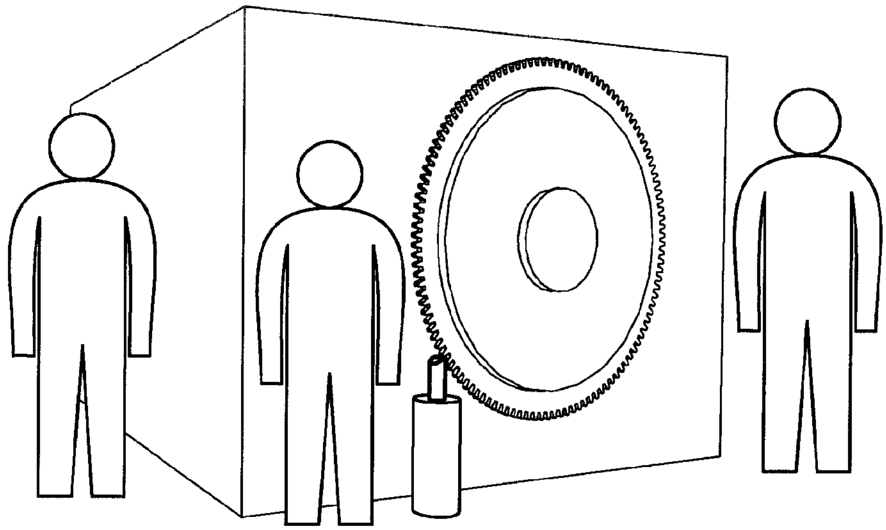
FIG. 2 is a schematic view of the prior art of jacking.
Figure 3:
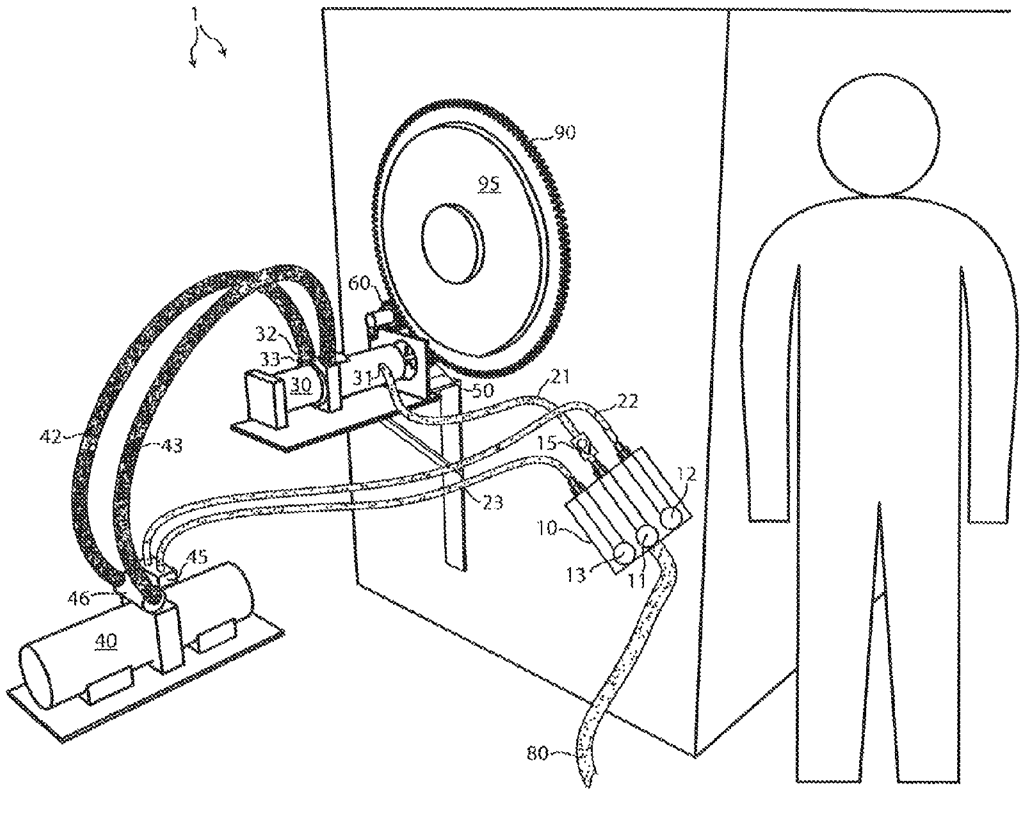
FIG. 3 is a schematic view of the invention in use.
Figure 10:
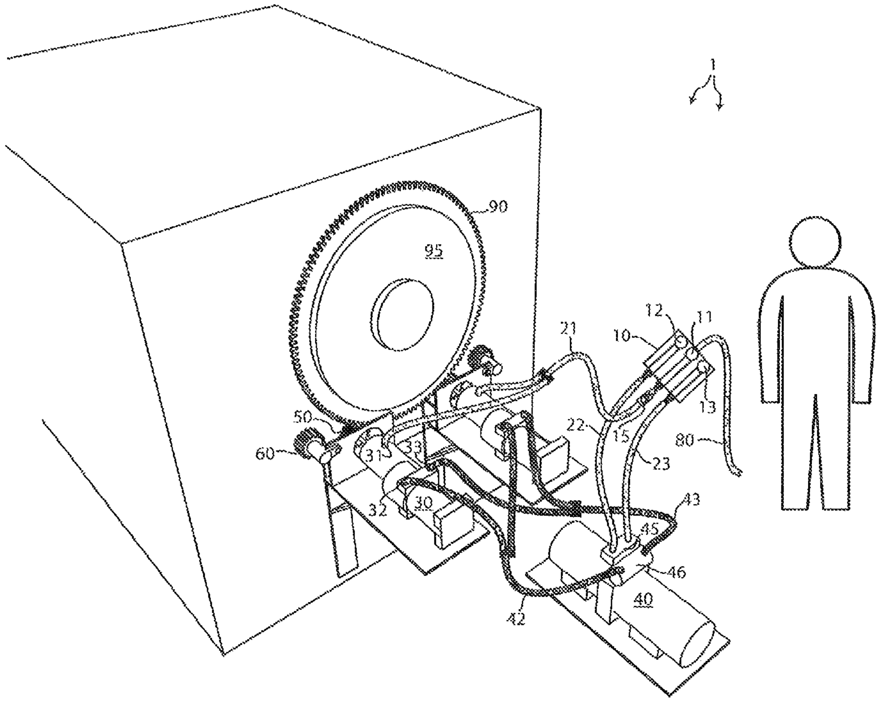
FIG. 10 is a schematic view of an embodiment of the invention coupled to an engine’s ring gear at two points.

Referring to FIG. 3 & FIG. 10, my invention provides a barring-tool system 1 having a manual control unit 10 controlling a barring motor 30 driven by a force generator 40 and in turn driving a retractable pinion 50 which drives a ring gear 90 surrounding a flywheel 95 of a large engine. A middle control switch 11 causes the barring motor to start and to extend the retractable pinion 50 into contact with the ring gear 90 or to retract away from such contact. A right control switch 12 causes the force generator 40 to deliver a force 42 to the barring motor 30 such that the pinion 50 is driven at low speed and high torque in a nominally left-handed direction resulting in a nominally right-handed rotation of the ring gear 90. A left control switch 13 causes the force generator 40 to deliver a force 43 to the barring motor 30 such that the pinion 50 is driven at low speed and high torque in a nominally right-handed direction resulting in a nominally left-handed rotation of the ring gear 90.

In a preferred embodiment, the system uses a combination of electrical, pneumatic, and hydraulic forces for safety, efficiency, and reliability reasons. The control paths 21, 22, 23 emerging from the manual controller are pneumatic, providing an explosion-proof, reliable lower-pressure motivating force for extension of the pinion when pneumatic force is applied at the pinion-extension port 31 of the barring motor 30, and for activating the bidirectional relay 45 of the force generator 40, which in turn activates the appropriate directional force 42, 43 from the bidirectional manifold 46. The force provided by the force generator 40 to the barring motor 30 is hydraulic, providing an explosion-proof, reliable higher-pressure motivating force to drive the barring motor 30 to rotate the pinion in either direction at low speed and high torque. The hydraulic pressure in the preferred embodiment is in turn generated by an electric motor.

In the preferred embodiment, the pneumatic pressure 80 is supplied by an outside air compressor such as an engine room’s standard compressed air supply. Air pressures in the range of 70 to 100 p.s.i. are sufficient, and only a modest volume of flow is required by the system. Depending upon the size and other characteristics of the engine to be turned, hydraulic pressures between 200 and 400 p.s.i. are likely to be needed by the barring motor 30 in order to provide the required torque for turning the engine.

For very large or hard-to-turn engines, an embodiment having two or more barring motors 30 driving two or more pinions 50 at different points on the ring gear can be used, as shown in FIG. 10. In such an embodiment, the shared channels of pneumatic and hydraulic forces ensure that the two or more barring motors perform in coordination with each other.

When neither the right nor the left manual control switches are activated, or when they are both activated, the barring motor 30 and the pinion 50 are locked in place by the equal hydraulic pressures on both the right- and left-turning sides. If the pinion 50 remains extended and in contact with the ring gear 90 when the barring motor and pinion are locked in place, the ring gear and the engine will also be locked in place so that the engine cannot accidentally or spontaneously rotate out of the locked position. An optional check valve 15 placed somewhere in the pneumatic line 21 feeding the pinion-extension port 31 of the barring motor 30 will latch the pinion in a pressurized and therefore extended state until the check valve is cleared and the pinion is allowed to retract, thereby keeping the pinion extended for locking purposes even if the middle button 11 of the manual controller 10 is released.

The barring-tool system 1 is adapted to both permanent and temporary installation on any single large engine or for use, in turn, on several large engines. In order to apply the proper rotational force, the barring motor 30 and pinion 50 must be either permanently or temporarily mounted to either the frame of the engine itself or to a mounting surface fixed in relation to the frame of the engine, so that the pinion 50, when extended, contacts the ring gear 90, and so that the required torque can be applied without dislodging the barring motor.

The force generator 40 or hydraulic-pressure generator is not mounted in any fixed relation to the engine, and can be located at a variety of locations near to or farther from the engine, within any performance limitations of long runs of pneumatic and hydraulic lines. In an engine room with multiple engines, a single force generator 40 or hydraulic-pressure generator could serve, in turn, all engines. And the barring motor 30 or motors could be moved from engine to engine as needed, or could be mounted on particular engines for longer periods if a frequent need for barring is anticipated. The barring-tool system 1 is also well adapted to use as a transportable system that can be carried in a small truck or van from site to site as needed for periodic scheduled or emergency maintenance of engines.

Figure 4:
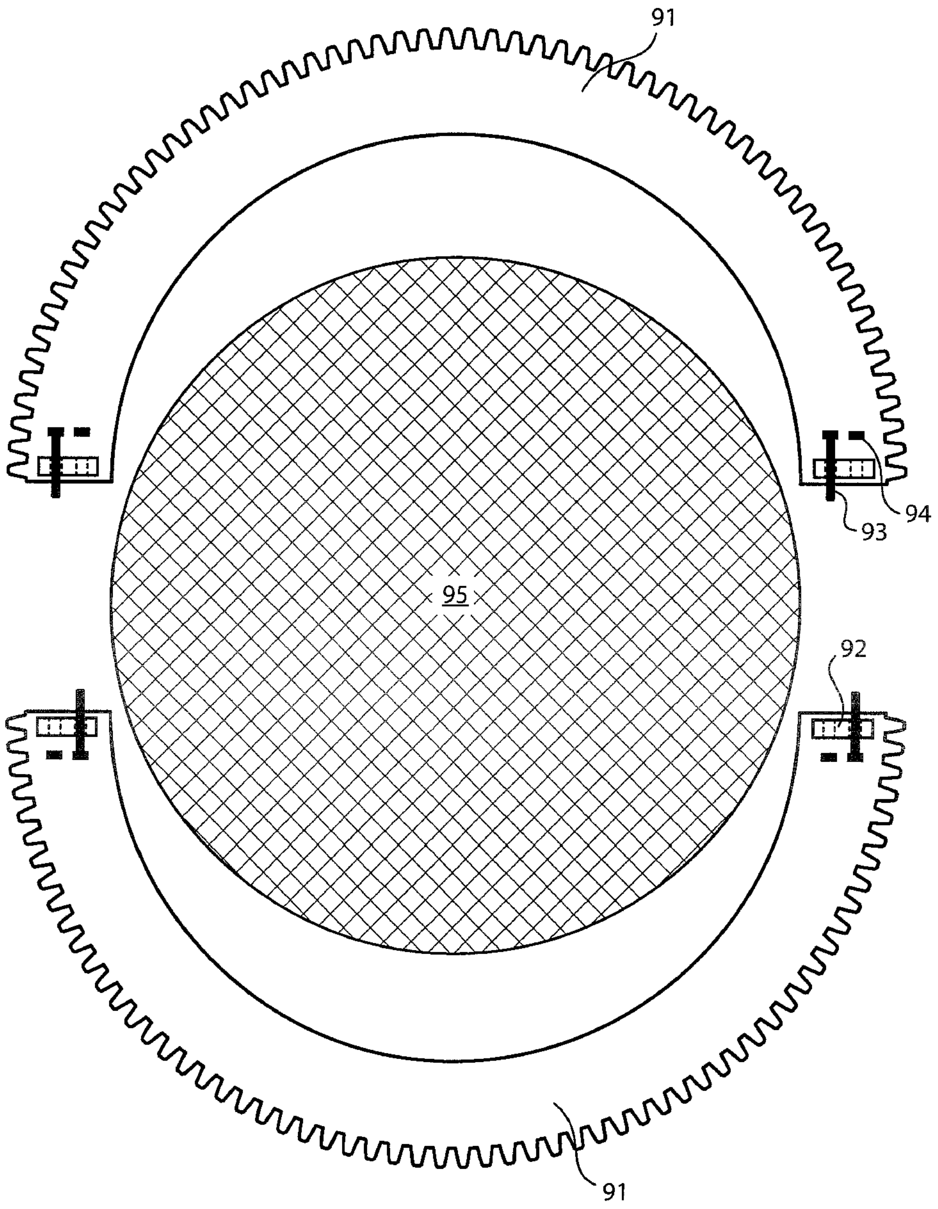
FIG. 4 is a schematic view of the invention’s optional split ring gear before installation.
Figure 5:
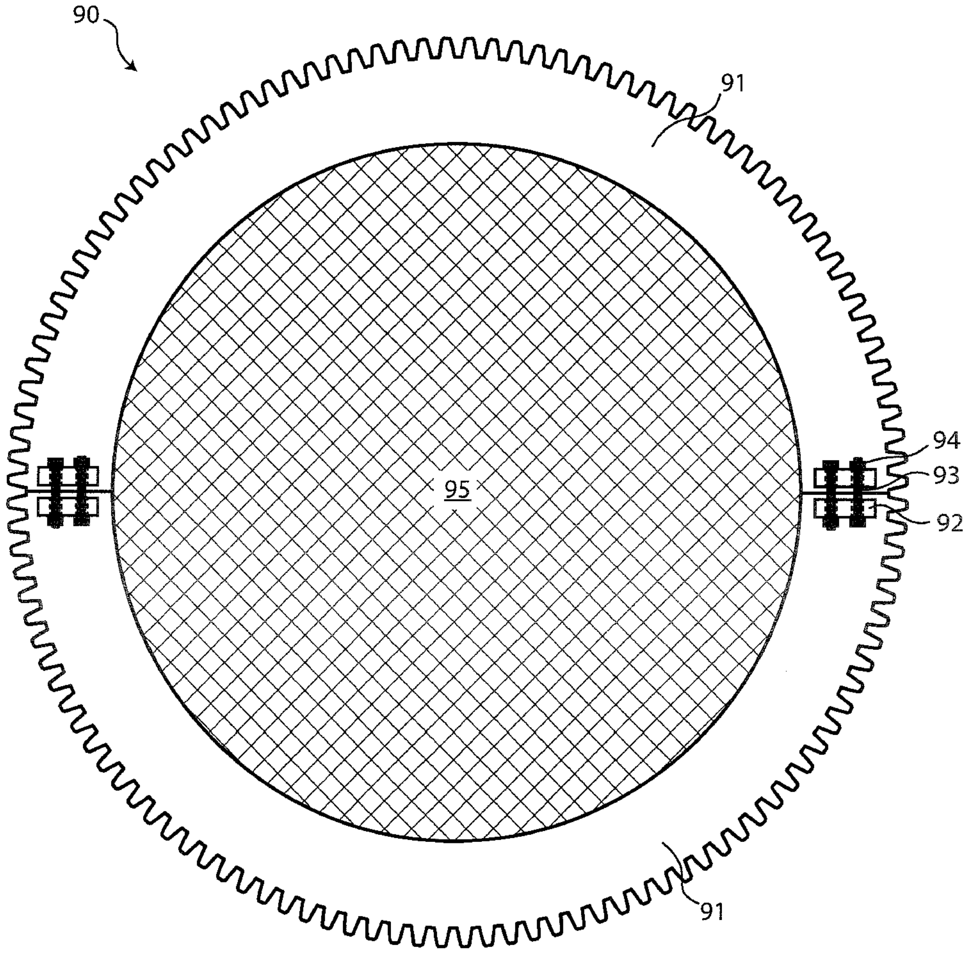
FIG. 5 is a schematic view of the invention’s optional split ring gear after installation.

Referring to FIG. 4 & FIG. 5, in order that the barring-tool system can be used on engines that do not normally have a suitable exposed ring gear 90, or where an existing ring gear has been damaged beyond use, my invention provides split-ring-gear adapters 91 that can be mounted on an engine's flywheel 95 or crankshaft and connected together to form a temporary or semi-permanent ring gear suitable for use with the barring-tool system. The split-ring-gear adapters 91 are two or more semi-circular or partially circular sections of ring gear that together form a circle of an appropriate inner-face diameter matching the outer diameter of a particular engine's flywheel 95 or crankshaft, and a geared outer-face diameter performing as a ring gear with which to rotate the flywheel and the crankshaft of the engine. The split-ring-gear adapters 91 are provided with matching connection points 92 which can be connected by standard bolts 93 and nuts 94, where the clamping or compressive force of the split-ring-gear adapters can be regulated by the force placed on the connection points by the bolts and nuts connections. The resulting ring gear allows an engine to be barred with the barring-tool system. Although the resulting ring gear assembled from split-ring-gear adapters might be poorly balanced due to the added mass of the connection points or due to imprecise placement upon the flywheel, the ring gear is only necessary for the low-speed barring operations during maintenance or inspection, and can be removed afterwards, so that it does not affect the normal running of the engine in any way. The split-ring-gear adapters allow for the use of the barring-tool system on a temporary or emergency basis on a greater variety of engines.

Figure 6:
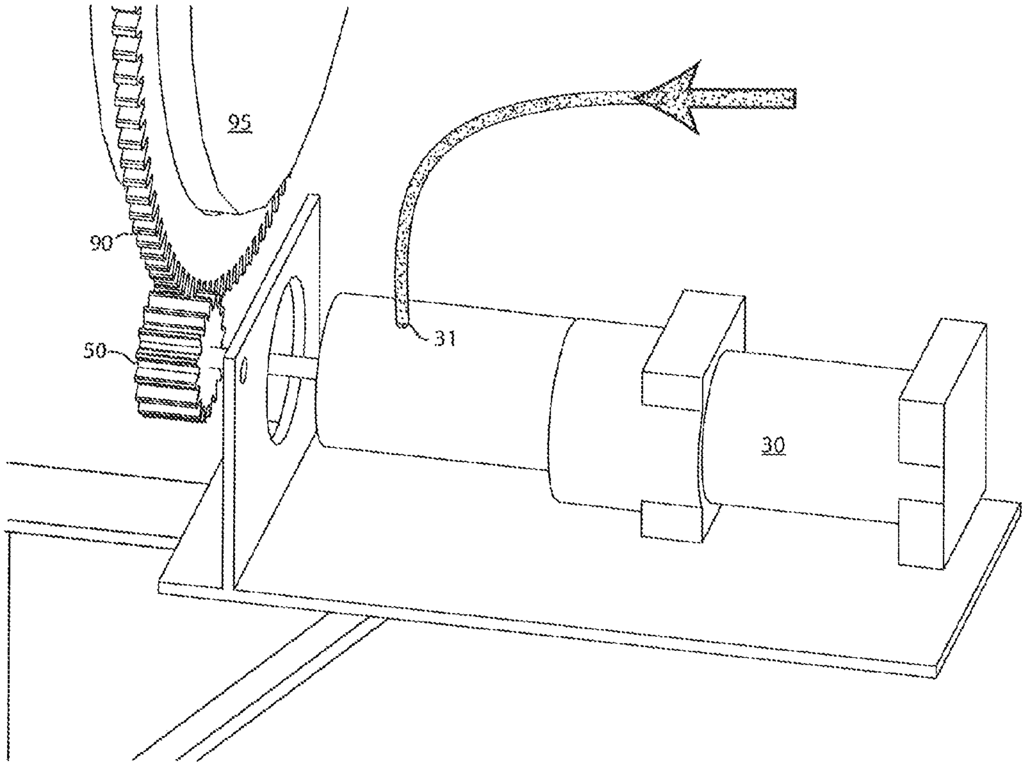
FIG. 6 is a schematic view of the invention coupled to an engine’s ring gear.
Figure 7:
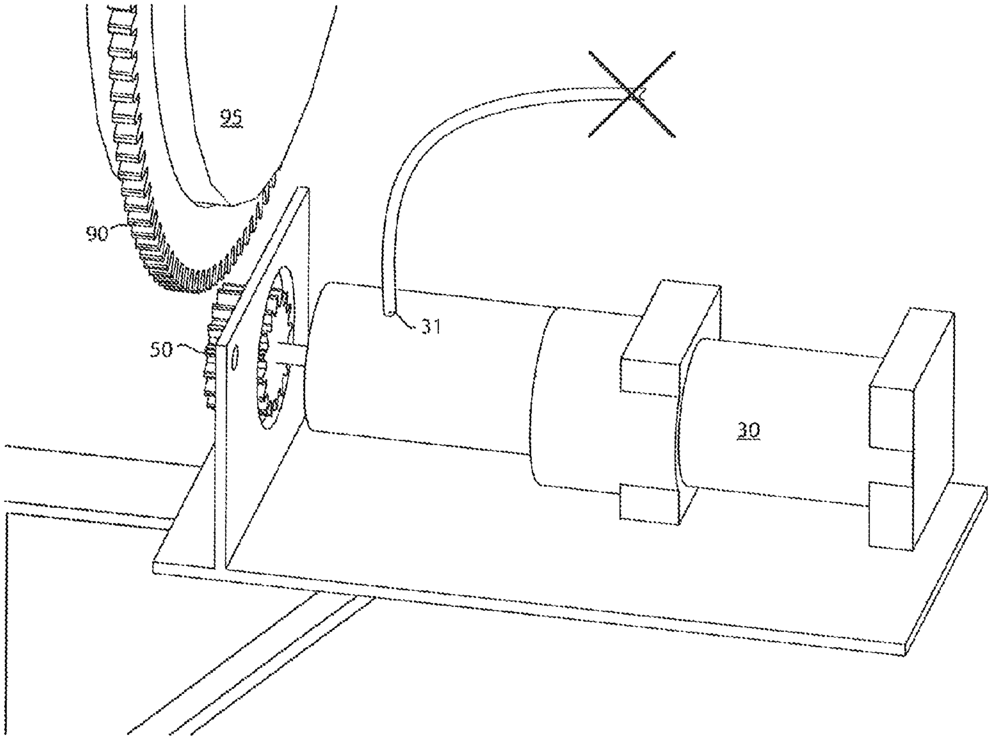
FIG. 7 is a schematic view of the invention uncoupled from an engine’s ring gear.

Referring to FIG. 6 & FIG. 7, the barring motor 30, when a control signal is present at the pinion-extension port 31, extends the pinion 50 so that it makes contact with the ring gear 90 surrounding the flywheel 95 and crankshaft of the engine. Conversely, when the control signal is absent at the pinion-extension port 31, the pinion 50 returns to its retracted position out of contact with the ring gear 90. In a preferred embodiment, compressed air in a pneumatic tube acts as both the control signal for extension of the pinion and as the motive force for extending the pinion, directly working upon a pneumatic extending actuator against the retracting force of a spring. The same function could be accomplished with electricity or hydraulic pressure, but at greater cost and complexity in the potentially explosive conditions of many engine rooms.

Figure 8:
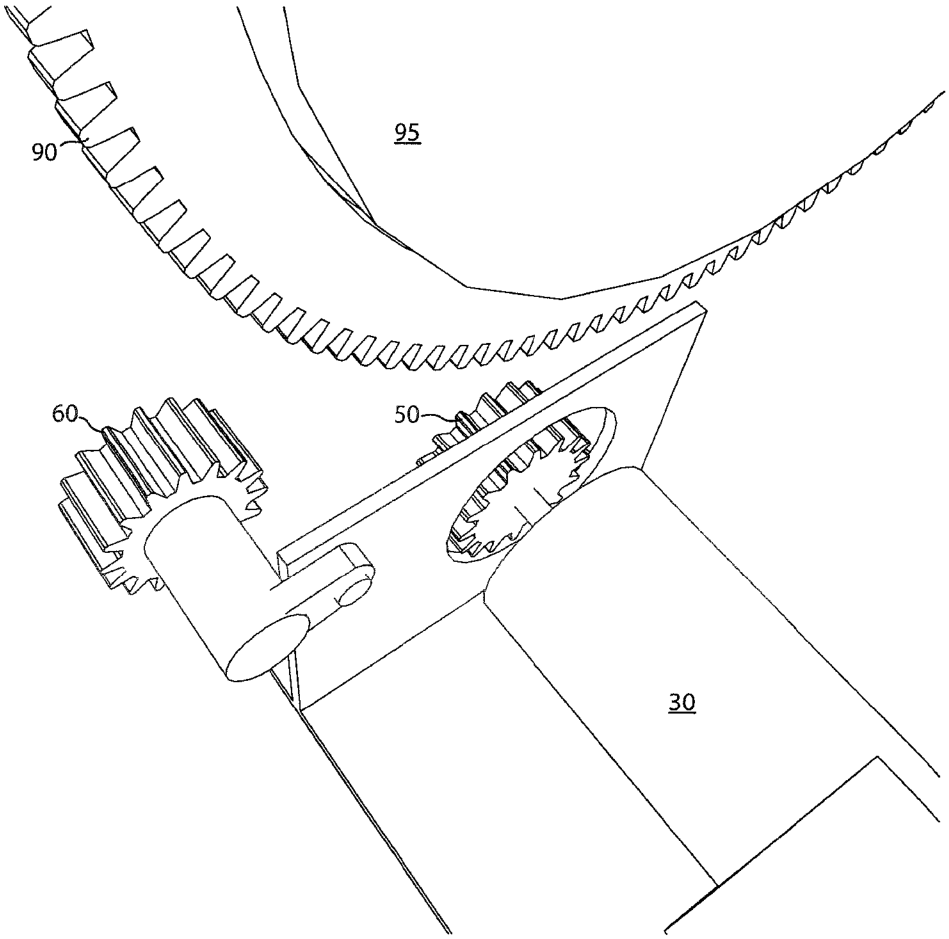
FIG. 8 is a schematic view of the invention’s manual secondary brake disengaged from an engine’s ring gear.
Figure 9:
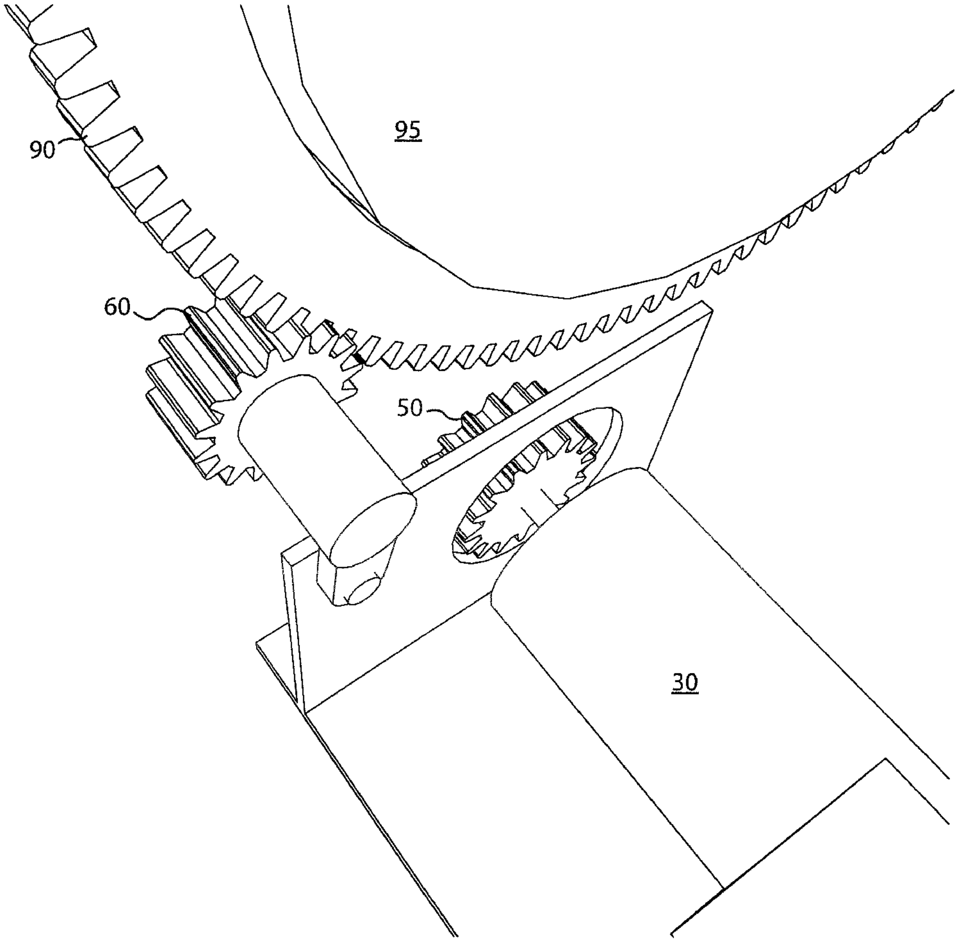
FIG. 9 is a schematic view of the invention’s manual secondary brake engaged with an engine’s ring gear.

Referring to FIG. 8 & FIG. 9, the barring-tool system of the invention also provides a manual secondary brake 60 essentially in the form of a pinion 50 to engage the ring gear 90, but mounted in a non-rotating, fixed, locked state with regard to rotation of the ring gear. The manual secondary brake 60 is movably or removably mounted to the same mounting surface as the barring motor 30 and pinion 50 in such a way that the manual secondary brake 60 can be placed out of contact with the ring gear 90 to allow rotation of the crankshaft of the engine, or be placed in contact with the ring gear 90 to prevent further rotation of the crankshaft, thus locking the engine in place to prevent any spontaneous rotation or any accidentally initiated rotation, either of which can be dangerous and damaging to personnel or to the engine. Because the barring-tool system provides a pinion 50 that also locks an engine against rotation whenever the pinion is extended into contact with the ring gear but is not being actively rotated in either direction, the manual secondary brake 60 serves as an additional means of locking the engine against rotation, under manual control independent of any accidental improper operation of the manual control unit 10, malfunction or failure of the electric, pneumatic, or hydraulic components of the barring-tool system, or other potential sources of unwanted and dangerous rotation of the crankshaft during maintenance or inspection. In a preferred embodiment, the manual secondary brake is mounted on an offset pivot point so that it can be manually rotated into or out of contact with the ring gear.

Many changes and modifications can be made in the present invention without departing from the spirit thereof. We therefore pray that our rights to the present invention be limited only by the scope of the appended claims.

I claim:

1. A barring-tool system for controlled rotation and locking of crankshafts of large engines, generators, and turbines, said engine, generator, or turbine each featuring a frame of said engine, generator, or turbine, comprising:

a retractable pinion adapted to extend toward and to engage with and drive a ring gear surrounding the crankshaft of the engine in either a right-handed or left-handed direction and to hold the ring gear in position when no driving force is applied;

a barring motor connected to said retractable pinion, where said barring motor is adapted to extend and retract said retractable pinion according to the state of a signal at a pinion-extension port, and to drive said retractable pinion in either direction at low speed and high torque, or to hold said retractable pinion in position against high torque;

a force generator adapted to provide motive force to said barring motor sufficient to drive said retractable pinion in either direction at low speed and high torque, or to hold said retractable pinion in position against high torque;

a manual control unit, further comprising:

a middle control switch controlling the state of a signal at said pinion-extension port, in turn causing said barring motor to extend said retractable pinion into contact with the ring gear or to retract away from such contact;

a right control switch causing said force generator to transmit motive force to said barring motor such that said retractable pinion is driven at low speed and high torque in a nominally left-handed direction resulting in a nominally right-handed rotation of the ring gear; and a left control switch causing said force generator to transmit motive force to said barring motor such that said retractable pinion is driven at low speed and high torque in a nominally right-handed direction resulting in a nominally left-handed rotation of the ring gear;

where said barring motor with said retractable pinion is further adapted to be mounted to a mounting surface fixed in relation to the frame of the engine so that said retractable pinion, when extended, contacts the ring gear, and so that the required torque can be applied without dislodging said barring motor with said retractable pinion; and a manual secondary brake movably mounted to said mounting surface fixed in relation to the frame of the engine of said barring motor and retractable pinion, where said manual secondary brake is adapted to be placed out of contact with the ring gear to prevent further rotation of the crankshaft;

where said force generator further comprises a bidirectional relay adapted to respond to signals from said right control switch and said left control switch, in turn controlling release of motive force from a bidirectional manifold such that either a right-turning force, a left-turning force, or an equal, static force is transmitted to said barring motor and said retractable pinion according to the state of said control switches.

2. The barring-tool system of claim 1, where said manual control unit further comprises pneumatic control of said pinion-extension port and said bidirectional relay.

3. A barring-tool system for controlled rotation and locking of crankshafts of large engines, generators, and turbines, said engine, generator, or turbine each featuring a frame of said engine, generator, or turbine, comprising:

a retractable pinion adapted to extend toward and to engage with and drive a ring gear surrounding the crankshaft of the engine in either a right-handed or left-handed direction and to hold the ring gear in position when no driving force is applied;

a barring motor connected to said retractable pinion, where said barring motor is adapted to extend and retract said retractable pinion according to the state of a signal at a pinion-extension port, and to drive said retractable pinion in either direction at low speed and high torque, or to hold said retractable pinion in position against high torque;

a force generator adapted to provide motive force to said barring motor sufficient to drive said retractable pinion in either direction at low speed and high torque, or to hold said retractable pinion in position against high torque;

a manual control unit, further comprising:

a middle control switch controlling the state of a signal at said pinion-extension port, in turn causing said barring motor to extend said retractable pinion into contact with the ring gear or to retract away from such contact;

a right control switch causing said force generator to transmit motive force to said barring motor such that said retractable pinion is driven at low speed and high torque in a nominally left-handed direction resulting in a nominally right-handed rotation of the ring gear; and a left control switch causing said force generator to transmit motive force to said barring motor such that said retractable pinion is driven at low speed and high torque in a nominally right-handed direction resulting in a nominally left-handed rotation of the ring gear;

where said barring motor with said retractable pinion is further adapted to be mounted to a mounting surface fixed in relation to the frame of the engine so that said retractable pinion, when extended, contacts the ring gear, and so that the required torque can be applied without dislodging said barring motor with said retractable pinion; and a manual secondary brake movably mounted to said mounting surface fixed in relation to the frame of the engine of said barring motor and retractable pinion, where said manual secondary brake is adapted to be placed out of contact with the ring gear to prevent further rotation of the crankshaft;

where said force generator further comprises a source of hydraulic force and a bidirectional manifold further comprising hydraulic valves.

4. A barring-tool system for controlled rotation and locking of crankshafts of large engines, generators, and turbines, said engine, generator, or turbine each featuring a frame of said engine, generator, or turbine, comprising:

a retractable pinion adapted to extend toward and to engage with and drive a ring gear surrounding the crankshaft of the engine in either a right-handed or left-handed direction and to hold the ring gear in position when no driving force is applied;

a barring motor connected to said retractable pinion, where said barring motor is adapted to extend and retract said retractable pinion according to the state of a signal at a pinion-extension port, and to drive said retractable pinion in either direction at low speed and high torque, or to hold said retractable pinion in position against high torque;

a force generator adapted to provide motive force to said barring motor sufficient to drive said retractable pinion in either direction at low speed and high torque, or to hold said retractable pinion in position against high torque;

a manual control unit, further comprising:

a middle control switch controlling the state of a signal at said pinion-extension port, in turn causing said barring motor to extend said retractable pinion into contact with the ring gear or to retract away from such contact;

a right control switch causing said force generator to transmit motive force to said barring motor such that said retractable pinion is driven at low speed and high torque in a nominally left-handed direction resulting in a nominally right-handed rotation of the ring gear; and a left control switch causing said force generator to transmit motive force to said barring motor such that said retractable pinion is driven at low speed and high torque in a nominally right-handed direction resulting in a nominally left-handed rotation of the ring gear;

where said barring motor with said retractable pinion is further adapted to be mounted to a mounting surface fixed in relation to the frame of the engine so that said retractable pinion, when extended, contacts the ring gear, and so that the required torque can be applied without dislodging said barring motor with said retractable pinion; and a manual secondary brake movably mounted to said mounting surface fixed in relation to the frame of the engine of said barring motor and retractable pinion, where said manual secondary brake is adapted to be placed out of contact with the ring gear to prevent further rotation of the crankshaft;

where said barring motor further comprises a bidirectional hydraulic motor adapted to drive said retractable pinion in either direction at low speed and high torque, and to hold said retractable pinion in position against high torque.

* * * * *